United States Patent
Singh et al.

(10) Patent No.: US 10,035,457 B2
(45) Date of Patent: Jul. 31, 2018

(54) VEHICLE HITCH ASSISTANCE SYSTEM

(71) Applicant: Jaguar Land Rover Limited, Coventry (GB)

(72) Inventors: Harpreet Singh, Coventry (GB); Damian Ward, Coventry (GB); Andrew Bradley, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 187 days.

(21) Appl. No.: 14/784,195

(22) PCT Filed: Apr. 24, 2014

(86) PCT No.: PCT/EP2014/058373
§ 371 (c)(1),
(2) Date: Oct. 13, 2015

(87) PCT Pub. No.: WO2014/174028
PCT Pub. Date: Oct. 30, 2014

(65) Prior Publication Data
US 2016/0075281 A1 Mar. 17, 2016

(30) Foreign Application Priority Data
Apr. 26, 2013 (GB) .................................. 1307525.4

(51) Int. Cl.
*B60D 1/00* (2006.01)
*B60R 1/00* (2006.01)
(Continued)

(52) U.S. Cl.
CPC .................. *B60R 1/00* (2013.01); *B60D 1/36* (2013.01); *B60D 1/62* (2013.01); *B60G 17/015* (2013.01);
(Continued)

(58) Field of Classification Search
CPC ....... B60D 1/36; B62D 15/025; B62D 15/028
(Continued)

(56) References Cited

U.S. PATENT DOCUMENTS 5,539,647 A 7/1996 Shibata et al.
6,226,389 B1 * 5/2001 Lemelson ............. G01S 13/931
382/104
(Continued)

FOREIGN PATENT DOCUMENTS

DE 195 26 702 A1 2/1997
DE 10 2005 043 466 A1 3/2007
(Continued)

OTHER PUBLICATIONS

Combined Search and Examination Report, Application No. GB1307524.7, dated Oct. 28, 2013, 8 pages.
(Continued)

*Primary Examiner* — Jeffery Williams
(74) *Attorney, Agent, or Firm* — Myers Bigel, P.A.

(57) ABSTRACT

A system (1) for monitoring available space to maneuver a vehicle (3) to align a tow hitch (5) mounted to the vehicle with a trailer coupling (7) mounted to a trailer (9). An imaging system (11, 13, 15) is provided to generate image data. A processor (37) is configured to analyze said image data to identify obstructions proximal to said vehicle and/or to said trailer and to determine if there is sufficient space available to maneuver the vehicle to align the tow hitch with the trailer coupling.

19 Claims, 5 Drawing Sheets

(51) Int. Cl.
*B60D 1/36* (2006.01)
*B62D 15/02* (2006.01)
*B60D 1/62* (2006.01)
*B60G 17/015* (2006.01)
*G06K 9/00* (2006.01)

(52) U.S. Cl.
CPC ......... *B62D 15/025* (2013.01); *B62D 15/028* (2013.01); *B62D 15/0265* (2013.01); *B62D 15/0285* (2013.01); *G06K 9/00805* (2013.01); *B60R 2300/808* (2013.01)

(58) Field of Classification Search
USPC ....................................................... 348/118
See application file for complete search history.

(56) References Cited

U.S. PATENT DOCUMENTS

| | | | |
|---|---|---|---|
| 6,292,094 | B1 | 9/2001 | Deng et al. |
| 8,038,166 | B1 | 10/2011 | Piesinger |
| 8,191,915 | B2 | 6/2012 | Freese et al. |
| 2001/0027363 | A1* | 10/2001 | Shimazaki ............... B60R 1/00 701/41 |
| 2002/0036390 | A1 | 3/2002 | Sargent |
| 2002/0149673 | A1 | 10/2002 | Hirama et al. |
| 2005/0007143 | A1 | 1/2005 | Ishigaki |
| 2005/0074143 | A1 | 4/2005 | Kawai |
| 2009/0236825 | A1 | 9/2009 | Okuda et al. |
| 2010/0004095 | A1 | 1/2010 | Sokoll |
| 2010/0096203 | A1 | 4/2010 | Freese et al. |
| 2010/0332049 | A1 | 12/2010 | Sy et al. |
| 2011/0001614 | A1 | 1/2011 | Ghneim |
| 2011/0001825 | A1 | 1/2011 | Hahn |
| 2011/0210529 | A1 | 9/2011 | Markstaller |
| 2011/0216199 | A1 | 9/2011 | Trevino et al. |
| 2012/0092191 | A1 | 4/2012 | Stefik et al. |
| 2012/0096490 | A1 | 4/2012 | Barnes, Jr. |
| 2012/0271512 | A1 | 10/2012 | Rupp et al. |
| 2013/0020144 | A1 | 1/2013 | Troy et al. |
| 2013/0226390 | A1* | 8/2013 | Luo .......................... B60D 1/36 701/25 |
| 2014/0137673 | A1 | 5/2014 | Troy et al. |
| 2014/0172232 | A1 | 6/2014 | Rupp et al. |
| 2014/0188344 | A1* | 7/2014 | Lavoie .................. B60W 30/00 701/41 |
| 2014/0188346 | A1 | 7/2014 | Lavoie |
| 2014/0200759 | A1* | 7/2014 | Lu .......................... B60D 1/245 701/28 |
| 2014/0210456 | A1 | 7/2014 | Crossman |
| 2014/0218506 | A1 | 8/2014 | Trombley et al. |
| 2014/0236532 | A1 | 8/2014 | Trombley et al. |
| 2014/0249691 | A1 | 9/2014 | Hafner et al. |
| 2014/0249723 | A1 | 9/2014 | Pilutti et al. |
| 2014/0267688 | A1 | 9/2014 | Aich et al. |
| 2014/0267689 | A1 | 9/2014 | Lavoie |
| 2014/0277942 | A1 | 9/2014 | Kyrtsos et al. |
| 2014/0288769 | A1 | 9/2014 | Trombley et al. |
| 2014/0297128 | A1 | 10/2014 | Lavoie et al. |
| 2014/0297129 | A1 | 10/2014 | Lavoie et al. |
| 2014/0303849 | A1 | 10/2014 | Hafner et al. |
| 2015/0149040 | A1 | 5/2015 | Hueger et al. |
| 2016/0039456 | A1 | 2/2016 | Lavoie et al. |
| 2016/0092962 | A1 | 3/2016 | Wasserman et al. |
| 2016/0096637 | A1 | 4/2016 | Troy et al. |
| 2016/0140614 | A1 | 5/2016 | Brubaker |
| 2017/0174022 | A1 | 6/2017 | Hu et al. |

FOREIGN PATENT DOCUMENTS

| | | |
|---|---|---|
| DE | 10 2005 043 468 A1 | 3/2007 |
| DE | 10 2006 035 021 A1 | 1/2008 |
| DE | 102010035299 A1 | 2/2012 |
| DE | 10 2012 005 707 A1 | 10/2012 |
| EP | 1 231 110 A2 | 8/2002 |
| EP | 1 249 365 A1 | 10/2002 |
| GB | 2 447 672 A | 9/2008 |
| WO | WO 2005/021344 A1 | 3/2005 |
| WO | WO 2005/080179 A1 | 9/2005 |
| WO | WO 2008/148635 A1 | 12/2008 |
| WO | WO 2010/064989 A1 | 6/2010 |
| WO | WO 2011/158107 A1 | 12/2011 |
| WO | WO 2012/059207 A1 | 5/2012 |
| WO | WO 2012/103193 A1 | 8/2012 |
| WO | WO 2012/117693 A1 | 9/2012 |
| WO | WO 2013/130479 A1 | 9/2013 |

OTHER PUBLICATIONS

Combined Search and Examination Report, Application No. GB1307525.4, dated Oct. 23, 2013, 5 pages.
Combined Search and Examination Report, Application No. GB1307525.4, dated Jun. 10, 2014, 4 pages.
International Search Report, PCT/EP2014/058387, dated Sep. 10, 2014, 4 pages.
Notification of Transmittal of the International Search Report and the Written Opinion of the International Searching Authority, PCT/EP2014/058372, dated Sep. 10, 2014, 12 pages.
Notification of Transmittal of the International Search Report and the Written Opinion of the International Searching Authority, PCT/EP2014/058373, dated Aug. 11, 2014, 11 pages.
Search and Examination Report, Application No. GB1307524.7, dated Jun. 5, 2014, 6 pages.
Communication pursuant to Article 94(3) EPC, EP Application No. 14 719 026.8, dated Oct. 18, 2017, 6 pp.

* cited by examiner ent stage application of PCT Application No. PCT/EP2014/058373, filed on Apr. 24, 2014, which claims priority from Great Britain Patent Application No. 1307525.4, filed on Apr. 26, 2013, the contents of which are incorporated herein by reference in their entireties. The above-referenced PCT International Application was published in the English language as International Publication No. WO 2014/174028 A1 on Oct. 30, 2014.

TECHNICAL FIELD

The present invention relates to a system for aligning a tow hitch with a trailer coupling; a processor; a method; and a vehicle.

BACKGROUND OF THE INVENTION

It is known from WO 2012/103193 to provide a vehicle with a rearward facing camera to capture images rearward of the vehicle. A visible target is disposed on the front of a trailer to be pulled by the vehicle. When the trailer is being pulled or towed by the vehicle, a processor is operable to process the captured images of the target to determine a trailer angle of the trailer relative to a longitudinal axis of the vehicle in real time. The driver can be provided with alerts based on the detected trailer angle; and/or vehicle systems (such as brake and steering systems) can be controlled.

It is further known from U.S. Pat. No. 8,191,915 to provide an automatic docking system for docking a towing vehicle with a towed vehicle. A camera provided on the vehicle detects a plurality of targets located on a hitch of the towed vehicle. The controller determines the location of the towing vehicle relative to the towed vehicle based on the detection of the plurality of targets. The vehicle is automatically steered by the controller towards the towed vehicle to assist in the docking of the towing vehicle to the towed vehicle.

It is against this background that the present invention has been conceived. At least in certain embodiments, the present invention seeks to overcome or ameliorate shortcomings associated with the prior art systems.

SUMMARY OF THE INVENTION

Aspects of the present invention relate to a system aligning a tow hitch with a trailer coupling; a processor; a method; and a vehicle.

According to a further aspect of the present invention there is provided a system for aligning a tow hitch mounted to a vehicle with a trailer coupling mounted to a trailer, the system comprising:
an imaging system disposed on the vehicle to generate image data; and
a processor configured to analyse said image data to identify first and second feature sets associated with said trailer; and to generate a guidance signal for steering the vehicle at least substantially to align the tow hitch with the trailer coupling;
wherein the processor is configured to determine the position of the trailer coupling relative to the tow hitch in dependence on said first feature set when the distance between the vehicle and the trailer is greater than a predefined threshold; and to determine the position of the trailer coupling relative to the tow hitch in dependence on said second feature set when the distance between the vehicle and the trailer is less than said predefined threshold.

The processor may thereby be operative to identify the first and second feature sets in dependence on a measured distance between the vehicle and the trailer. The first feature set can be identified to enable the vehicle to be manoeuvred into a first approximate position relative to the trailer. The imaging system can subsequently seek to identify the second feature set to facilitate alignment of the tow hitch with the trailer coupling. The processor can be configured to determine the position and also the orientation of the trailer coupling relative to the tow hitch in dependence on said first feature set and/or said second feature set.

The processor can be configured to determine the position of the trailer coupling relative to the tow hitch exclusively in dependence on the first feature set when the distance between the vehicle and the trailer is greater than said predefined threshold. When the distance between the vehicle and the trailer is less than the predefined threshold, the processor can be configured to determine the position of the trailer coupling relative to the tow hitch in dependence on both said first feature set and said second feature set. The processor can be configured to initiate a search for said second feature set when the distance between the vehicle and the trailer equals said predefined threshold.

The processor can be configured to output the steering guidance signal to steer the vehicle into a position in which the tow hitch is aligned with the trailer coupling. The steering guidance signal can be generated to result in a hitch angle, defined between the longitudinal axes of the vehicle and the trailer, which is at least substantially equal to zero or within a predefined angular margin (for example less than 15°, 30° or 45°).

The vehicle guidance module can be configured to control the steering guidance signal to provide a particular alignment between the vehicle and the trailer (i.e. hitch angle) when they are coupled. The steering guidance signal can position the vehicle to provide a hitch angle which will facilitate a subsequent towing operation of the trailer. The subsequent towing operation could be defined by the user, for example in a particular direction; or could be determined dynamically, for example to avoid one or more obstructions. The one or more obstructions could be identified by the user or by an image processing system. If the vehicle guidance module determines that said one or more obstructions will limit the turning circle of the trailer, then the approach path of the vehicle can be adjusted to modify (either to reduce or to increase) the hitch angle when the trailer is hitched onto the vehicle to facilitate towing (for example allowing the trailer to be towed out in a single forward motion avoiding said one or more obstructions). Other detections systems, such as sonar and radar systems could also be utilised to identify said obstruction(s).

The focus of the imaging system can change in dependence on the distance between the vehicle and the trailer. The imaging system can be configured to focus on said first feature set when the distance between the vehicle and the trailer is greater than said predefined threshold; and/or to focus on said second feature set when the distance between the vehicle and the trailer is less than said predefined threshold. The focusing of the imaging system can be performed optically, for example by adjusting a lens position. Alternatively, the focusing of the imaging system can be performed digitally, for example to focus on a region of the image data generated by the imaging system. A change in focus could, for example, be implemented digitally by the processor.

The first feature set can comprise one or more targets mounted to the trailer. Alternatively, or in addition, the first feature set can correspond to the profile of the trailer. The processor can be configured to utilise object identification techniques to identify the position and/or orientation of the trailer, for example with reference to a predefined trailer model. A library of predefined models could, for example, be stored in a database accessible to the processor.

The distance between the vehicle and the trailer can be determined by measuring known features of said first feature set and/or said second feature set. For example, the processor can measure known parameters of said one or more targets mounted to the trailer. Other distance measurement systems, for example comprising ultrasonic and/or radar sensors, can be employed to measure the distance between the vehicle and the trailer.

The second feature set can comprise a trailer coupling frame (also referred to as the trailer hitch) to which the trailer coupling is mounted. The second feature set could optionally comprise the trailer coupling. The processor can be configured to implement object identification techniques to identify the position and/or orientation of the trailer coupling frame. The trailer coupling frame typically comprises an A-frame. The processor can be configured to identify the position and orientation of the trailer coupling frame.

A human machine interface (HMI) can be provided to enable a user to specify the location of the trailer coupling. For example, the user can select the trailer coupling on a video display. The processor can subsequently track the features identified by the user on the video display as corresponding to the trailer coupling. The human machine interface could, for example, comprise a touchscreen display or a cursor displayed on a video screen.

The imaging system can comprise or consist of one or more rearward facing optical cameras. The imaging system can comprise a first camera disposed at the rear of the vehicle; and/or second and third cameras disposed on the left and right sides respectively of the vehicle. The second and third cameras can, for example, be mounted in respective left and right wing mirror housings.

The processor can apply image correction techniques to compensate for distortion of the image generated by the image system, for example to correct for foreshortening of the image. The processor can be configured to generate image correction data based on said first feature set, for example based on the position and/or orientation of the trailer as determined by referencing the first feature set. The processor can apply said image corrections to the image data to facilitate identification of the second feature set.

The processor can be configured to analyse said image data to identify obstructions proximal to said vehicle and/or said trailer. The processor can, for example, identify obstructions between the vehicle and the trailer; and/or obstructions to the side of the vehicle and/or the trailer. The processor can be configured to modify the steering guidance signal to avoid any obstructions identified in said image data by the processor. The obstructions could be fixed or stationary (such as buildings or parked vehicles); or could be moving (such as moving vehicles).

The processor can be configured to determine if there is sufficient space available to manoeuvre the vehicle to align the tow hitch with the trailer coupling.

The processor can optionally be configured to analyse the image data to determine a height of the trailer coupling. The processor can be configured to output a suspension height change signal to lower the vehicle suspension to position the tow hitch at a height below that of the trailer coupling. The tow hitch can subsequently be positioned under the trailer coupling by reversing the vehicle.

The processor can be configured to output said steering guidance signal to a human machine interface (HMI), for example to provide a visual display of the information on a screen. The user can use the information to adjust the steering wheel angle to match the steering angle determined by the processor. Alternatively, the processor can be configured to output said steering guidance signal to an electronic power assisted steering (EPAS) system to control a steering angle of the vehicle. The angular position of the steering wheel can be controlled automatically by the electronic power assisted steering (EPAS).

The user can operate the vehicle throttle to control vehicle speed (either in forward or reverse motion). The processor can be configured to implement an upper speed limit for the vehicle as it approaches the trailer, for example 6 km/h. Alternatively, the vehicle speed could be controlled automatically. For example the processor could be configured to output vehicle throttle control signals and/or brake control signals.

In an alternate arrangement, the system could be configured to override the distance threshold requirement if the processor identifies the second feature set before the first feature set is identified.

According to a further aspect of the present invention there is provided a processor programmed to:
receive image data from an imaging system disposed on the vehicle;
analyse said image data to identify first and second feature sets associated with said trailer; and
generate a steering guidance signal for steering the vehicle at least substantially to align the tow hitch with the trailer coupling;
wherein the image data is analysed to determine the position of the trailer relative to the vehicle in dependence on said first feature set when the distance between the vehicle and the trailer is greater than a predefined threshold; and to determine the position of the trailer relative to the vehicle in dependence on said second feature set when the distance between the vehicle and the trailer is less than said predefined threshold.

According to a further aspect of the present invention there is provided a method of aligning a tow hitch mounted to a vehicle with a trailer coupling mounted to a trailer, the method comprising:
receiving image data from an imaging system disposed on the vehicle;
analysing said image data to identify first and second feature sets associated with said trailer; and
generating a steering guidance signal for steering the vehicle at least substantially to align the tow hitch with the trailer coupling;
wherein the image data is analysed to determine the position of the trailer relative to the vehicle in dependence on said first feature set when the distance between the vehicle and the trailer is greater than a predefined threshold; and to determine the position of the trailer relative to the vehicle in dependence on said second feature set when the distance between the vehicle and the trailer is less than said predefined threshold.

The first and second feature sets can be identified at the same time or consecutively. The method can comprise identifying the first feature set when the distance between the vehicle and the trailer is greater than said predefined threshold; and identifying the second feature set when the distance between the vehicle and the trailer is less than said predefined threshold. The method can comprise focusing on the first feature set when the distance between the vehicle and the trailer is greater than said predefined threshold; and/or focusing on said second feature set when the distance between the vehicle and the trailer is less than said predefined threshold. The method can comprise adjusting an optical focus of one or more cameras in said imaging system. Alternatively, the method can comprise modifying the image data to apply a digital focus on said first and/or second feature set.

The first feature set can comprise one or more targets mounted to the trailer. Alternatively, the first feature set can comprise a profile or geometry of the trailer. The second feature set can comprise a trailer coupling frame to which the trailer coupling is mounted.

The method can comprise applying an image correction algorithm to the image data, for example to compensate for foreshortening of the image. The image correction algorithm could be based on the first feature set, for example determined by comparing the image data to a predefined model. The method can comprise applying an image correction algorithm to the image data to facilitate accurate tracking of said second feature set.

The method can comprise determining the position of the trailer coupling relative to the tow hitch exclusively in dependence on the first feature set when the distance between the vehicle and the trailer is greater than said predefined threshold. The method can comprise determining the position of the trailer coupling relative to the tow hitch in dependence on both said first feature set and said second feature set when the distance between the vehicle and the trailer is less than said predefined threshold.

According to a still further aspect of the present invention there is provided a system for monitoring available space to manoeuvre a vehicle to align a tow hitch mounted to the vehicle with a trailer coupling mounted to a trailer, the system comprising:
an imaging system disposed on the vehicle to generate image data;
a processor configured to analyse said image data to identify obstructions proximal to said vehicle and/or to said trailer and to determine if there is sufficient space available to manoeuvre the vehicle to align the tow hitch with the trailer coupling. The processor can be configured to calculate the required path to align the tow hitch with the trailer coupling. Based on known vehicle parameters (for example the vehicle length and width), the processor can then calculate the 'route corridor' required to manoeuvre the vehicle into position relative to the trailer. The imaging system can then identify obstacles proximal to the vehicle and/or the trailer, for example static obstacles (such as parked vehicles, buildings and walls). As the vehicle is manoeuvered relative to the trailer, the imaging system continues to monitor for obstacles proximal to the vehicle and/or the trailer, for example moving obstacles (such as pedestrians, vehicles, etc.).

The processor can be configured to generate a steering guidance signal for steering the vehicle at least substantially to align the tow hitch with the trailer coupling. The steering guidance signal can be adapted to avoid any obstructions identified by said processor. The processor can generate the steering guidance signal dynamically (for example based on a guidance algorithm); or could select a predefined steering guidance signal based on the available space to manoeuvre the vehicle, as determined by the processor. The steering guidance signal can be configured to implement a multi-movement strategy, for example comprising a series of reverse/forward movements.

An alert can be output to the vehicle driver if the processor determines that there is an obstruction in the current predicted path of the vehicle. The predicted path of the vehicle can, for example, be determined based on a current vehicle steering angle and a direction of travel (forward or reverse).

The system can be configured to provide an opportunity to override the obstacle detection performed by the processor. For example, a user can override a decision by the processor that there is insufficient space available to manoeuvre the vehicle into position.

The imaging system can comprise one or more optical cameras. Alternatively, or in addition, the imaging system can comprise one or more ultrasonic sensors and/or radar sensors.

According to a still further aspect of the present invention there is provided a method of monitoring available space to manoeuvre a vehicle to align a tow hitch mounted to the vehicle with a trailer coupling mounted to a trailer, the method comprising:
receiving image data from an imaging system disposed on the vehicle;
analysing said image data to identify obstructions proximal to said vehicle and/or to said trailer; and
determining if there is sufficient space available to manoeuvre the vehicle to align the tow hitch with the trailer coupling.

The method can comprise generating a steering guidance signal for steering the vehicle at least substantially to align the tow hitch with the trailer coupling. The steering guidance signal can be adapted to avoid any obstructions identified by analysing said image data.

The methods described herein can each be computer-implemented, for example on a computational apparatus comprising one or more microprocessors. According to a yet further aspect of the present invention there is provided a computer program product comprising a computer readable storage medium including computer readable program code, where the computer readable program code when executed on a computer causes the computer to perform the method(s) described herein.

The term processor used herein is to be understood as covering both single processors and multiple processors.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

An embodiment of the present invention will now be described, by way of example only, with reference to the accompanying Figures, in which.

DETAILED DESCRIPTION OF AN EMBODIMENT

Figure 1:
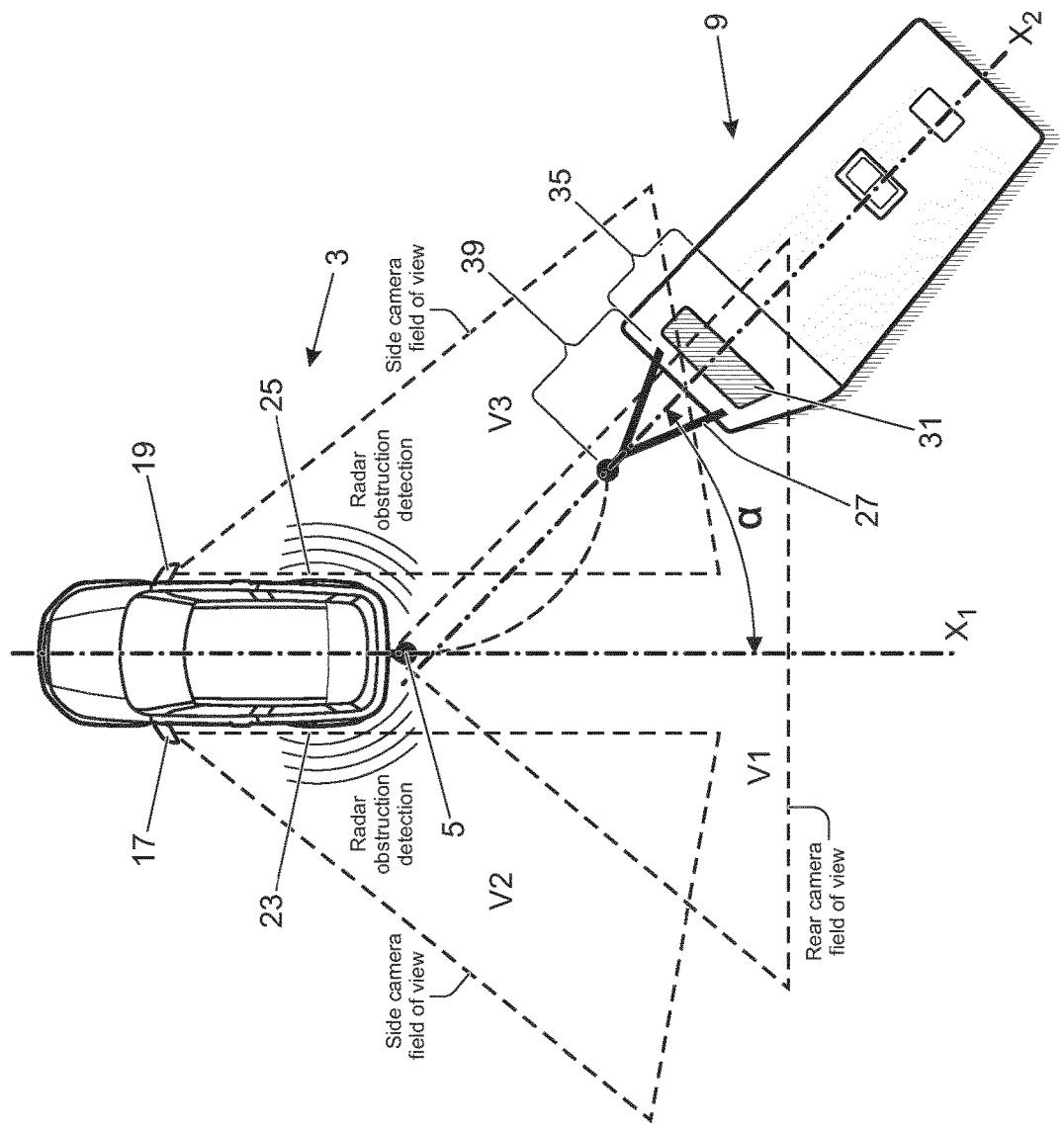
FIG. 1 shows a plan view of a vehicle and a trailer incorporating a hitch assistance system in accordance with an embodiment of the present invention.
Figure 2:
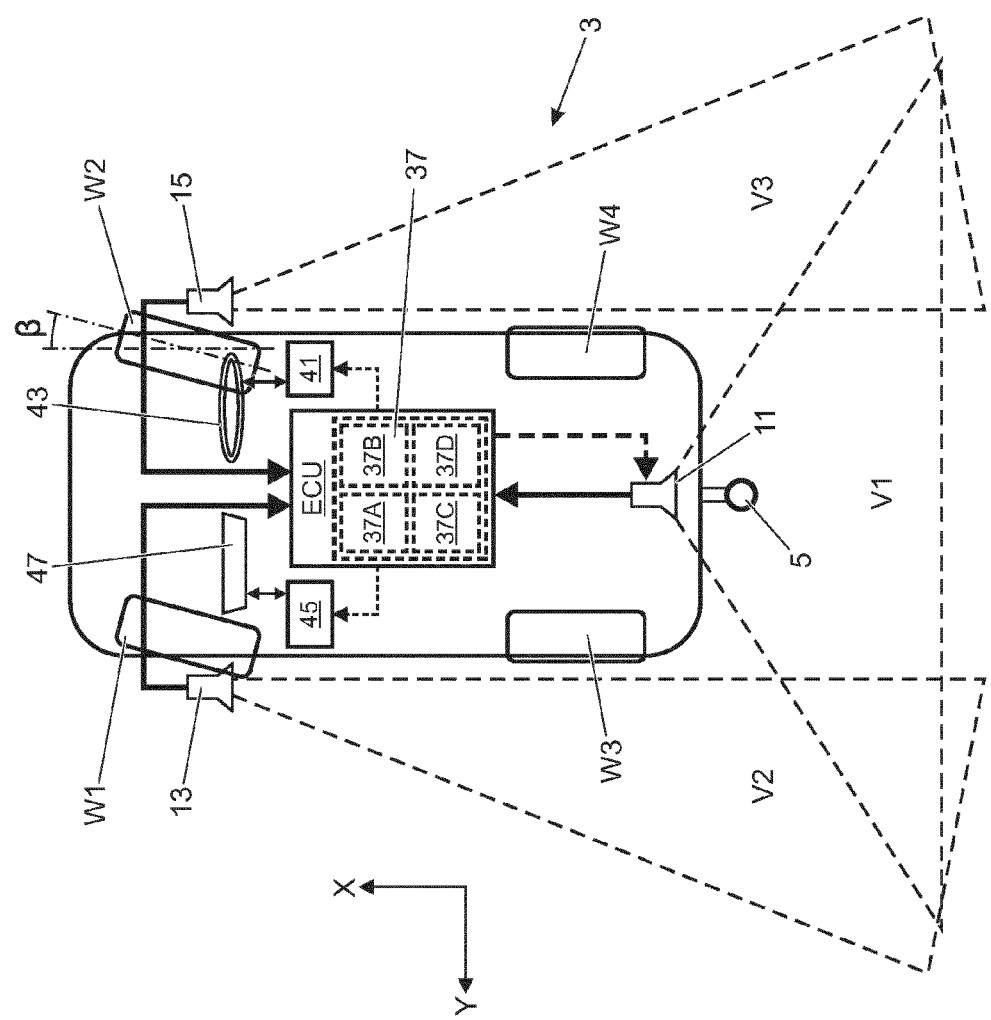
FIG. 2 shows a schematic representation of the vehicle and the hitch assistance system according to an embodiment of the present invention.

A hitch assistance system 1 in accordance with an aspect of the present invention will now be described with reference to FIGS. 1 to 4. The hitch assistance system 1 is implemented in a motor vehicle 3 to facilitate coupling a vehicle tow hitch 5 disposed at the rear of the vehicle 3 to a trailer coupling 7 mounted to a trailer 9. The vehicle 3 has four wheels W1-4 mounted on an adjustable height air suspension (not shown). The front wheels W1, W2 of the vehicle 3 are steerable in conventional manner.

A plan view of the vehicle 3 and the trailer 9 are shown in FIG. 1. The vehicle 3 is provided with an imaging system comprising a centrally mounted rear camera 11; and left and right side cameras 13, 15 mounted in respective wing mirrors 17, 19. The cameras 11, 13, 15 are optical cameras arranged to face to the rear of the vehicle 3 and their fields of view V1, V2, V3 are illustrated by dashed triangles in FIG. 1. In addition, the vehicle 3 comprises an obstruction detection system 21 for detecting the presence of obstructions in the rear three quarters position of the vehicle 3. In the present embodiment, the obstruction detection system 21 comprises left and right radar systems 23, 25.

The trailer coupling 7 is an upwardly projecting tow ball but the present invention can be applied to other coupling arrangements, such as vertical pins and the like. The trailer coupling 7 is mounted to a hitch frame 27 disposed at the front of the trailer 9. In the present embodiment, the hitch frame 27 is an A-frame having a front apex 29 to which the trailer coupling 7 is mounted. A target 31 is mounted to a front face 33 of the trailer 9 to define a first feature set (denoted generally by the reference 35) to facilitate identification of the trailer 9 and to determine its position relative to the vehicle 3. In the present embodiment, the target 31 is a visible image comprising three circles arranged in a triangular formation. It will be appreciated that the present invention can be implemented with other targets 31, for example different symbols/images or non-visible targets.

The hitch assistance system 1 comprises an electronic control unit (ECU) having an electronic processor 37. The processor 37 comprises image processing means in the form of an image processing module 37A for analysing the image data. The cameras 11, 13, 15 each output image data to the image processing module 37A for analysis.

In a first operating mode, the image processing module 37A identifies the first feature set 35 within the image data to determine the position and orientation of the target 31 in relation to the vehicle 3. The processor 37 can thereby determine the relative position of the trailer 9 to the vehicle 3. The image processing module 37A is configured to operate in said first operating mode when the distance between the vehicle 3 and the trailer 9 is greater than a predefined threshold. The predefined threshold is 5 meters, but this can be increased or decreased depending on system parameters.

In a second operating mode, the image processing module 37A analyses the image data to identify a second feature set 39 associated with the trailer 9. In the present embodiment, the second feature set 39 is defined by the configuration of the hitch frame 27 disposed at the front of the trailer 9. In particular, the image processing module 37A is configured to identify the position and orientation of the A-frame to which the trailer coupling 7 is mounted. The image processing module 37A is configured to operate in said second operating mode when the distance between the vehicle 3 and the trailer 9 is less than the predefined threshold of 5 meters. In an alternate arrangement, the image processing module 37A could be configured to identify both said first feature set 35 and said second feature 39 in said second operating mode.

The first feature set 35 can be defined in a target geometry file; and the second feature set 39 can be defined in a trailer geometry file. The geometry files can both be stored on a storage medium accessible to the processor 37. The target geometry file can be predefined, for example to define a specific target design supplied by the vehicle manufacturer. The trailer geometry file can comprise data defining the geometry of the frame 27 and optionally also the length and/or wheelbase of the trailer 9. A plurality of trailer geometry files can be stored, for example to represent different sizes/configurations of trailers. The hitch assistance system 1 can allow a user to select a predefined trailer model or to define a custom trailer model.

The processor 37 can be configured to output a camera control signal to the rear camera 11 to focus and/or zoom on a region of the image in which the second feature set 39 is expected to be located relative to the first feature set 35. The zoom function can be performed optically and/or digitally. Alternatively, or in addition, the image processing module 37A can be configured to analyse the image data from the rear camera 11 covering the region in which the second feature set 39 is expected to be located relative to the first feature set 35. The spatial relationship (i.e. position and orientation) between the first feature set 35 and the second feature set 39 is fixed and could be pre-defined or learned (for example during a calibration procedure or an earlier use of the system 1) to facilitate identification of the second feature set 39.

To provide improved accuracy when identifying the second feature set 39, the image processing module 37A can use data derived from the first feature set 35 to provide image corrections when analysing the image data to identify the second feature set 39. For example, the image processing module 37A can utilise the first feature set 35 to determine the position and/or attitude of the trailer 9. The image processing module 37A can use this information to allow for foreshortening of the image generated by the rear camera 11 to provide enhanced recognition of the second feature set 39. The image processing techniques could optionally be enhanced by signals from ultrasonic and/or radar sensors.

In addition to identifying the first and second feature set 35, 39, the image processing module 37A can be configured to identify obstructions within the field of view of the rear camera 11 and/or the side cameras 13, 15. The obstructions can be fixed or stationary obstructions, such as a building or a parked vehicle; and/or the obstructions can be moving, for example a pedestrian or a moving vehicle. The image processing module 37A can output obstruction data identifying the location and size of any identified obstructions. The image processing module 37A can, for example, operate to detect obstructions in the image data from the side cameras 13, 15 at the same time as identifying the first feature set 35 and/or the second each set 39 in image data from the rear camera 11. The image processing module 37A could utilise data from other sensors on board the vehicle 3, such as the radar systems 23, 25 and/or a forward-facing camera (not shown), to identify obstructions proximal the vehicle 3. The image processing module 37A can optionally also be configured to identify obstructions proximal to the trailer 9.

The processor 37 further comprises vehicle guidance means in the form of a vehicle guidance module 37B for calculating a steering angle for the front wheels W1, W2 to position the vehicle 3 in relation to the trailer 9 to enable the tow hitch 5 to be connected to the trailer coupling 7. In particular, the vehicle guidance module 37B is configured to position the vehicle 3 such that a hitch angle α, defined as the angular offset between a first longitudinal axis X1 of the vehicle 3 and a second longitudinal axis X2 of the trailer 9, is within a predefined range or is substantially 0°. The image processing module 37A can determine the second longitudinal axis X2 with reference to said first feature set and/or said second feature set.

If the image processing module 37A identifies one or more obstructions proximal to the trailer 9, the vehicle guidance module 37B can be configured to align the vehicle 3 with the trailer 9 such that the resulting hitch angle α facilitates towing of the trailer 9 whilst avoiding said one or more obstructions. The vehicle guidance module 37B could be configured to reduce the hitch angle α and/or to select a positive or negative hitch angle α to control the initial towing path of the trailer 9. The hitch angle α could be selected to enable the trailer to be towed away in a single forward movement, for example to remove the need to reverse the trailer 9. In certain instances this control technique may increase the path followed by the vehicle 3 during alignment with the trailer 9, but would facilitate towing of the trailer 9. The hitch assistance system 1 could be configured to receive user inputs to identify said one or more obstructions. This could be used instead of or in addition to identification of said one or more obstructions by the image processing module 37A.

In the event that the desired relative positioning cannot be achieved in a single uninterrupted movement (for example a single reversing movement), the vehicle guidance module 37B can be configured to calculate a sequence of movements (for example comprising forward/reverse travel; and/or different steering angles) to position the vehicle 3 relative to the trailer 9. The vehicle guidance module 37B outputs vehicle guidance signals including a steering angle control signal and/or a forward/reverse travel signal. The vehicle guidance signals can be transmitted to an instrument cluster (not shown) to display a message, for example requesting the driver to drive forward or to reverse.

The steering angle control signal is output to an electronic power assisted steering (EPAS) module 41 to control the angle of a steering wheel 43 to provide a required steering angle β for the front wheels W1, W2. The EPAS module 41 automatically adjusts the angular position of the steering wheel 43 to provide the appropriate steering angle β at the front wheels W1, W2 to guide the vehicle 3 into position relative to the trailer 9.

Figure 3A:
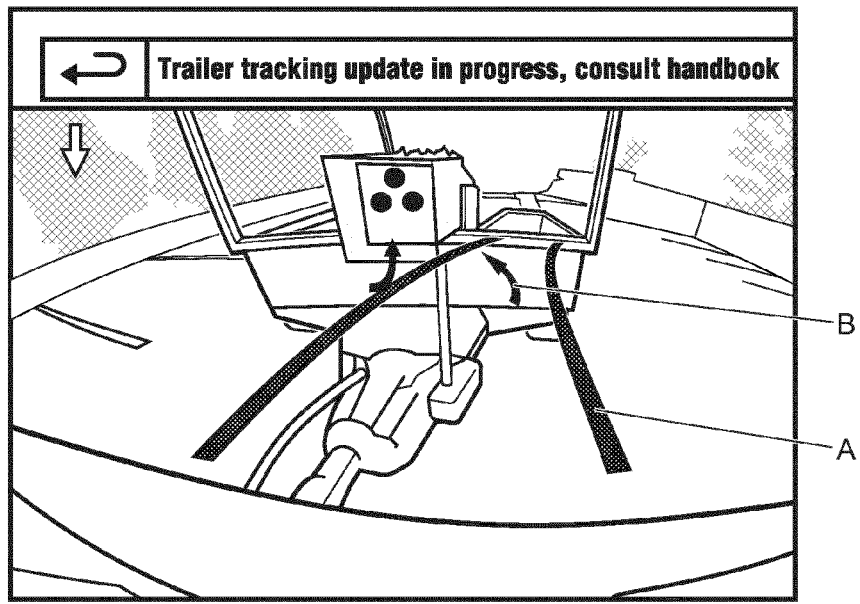
FIGS. 3A and 3B show images from the rearward facing camera overlaid with steering guidance information according to an embodiment of the present invention.
Figure 3B:
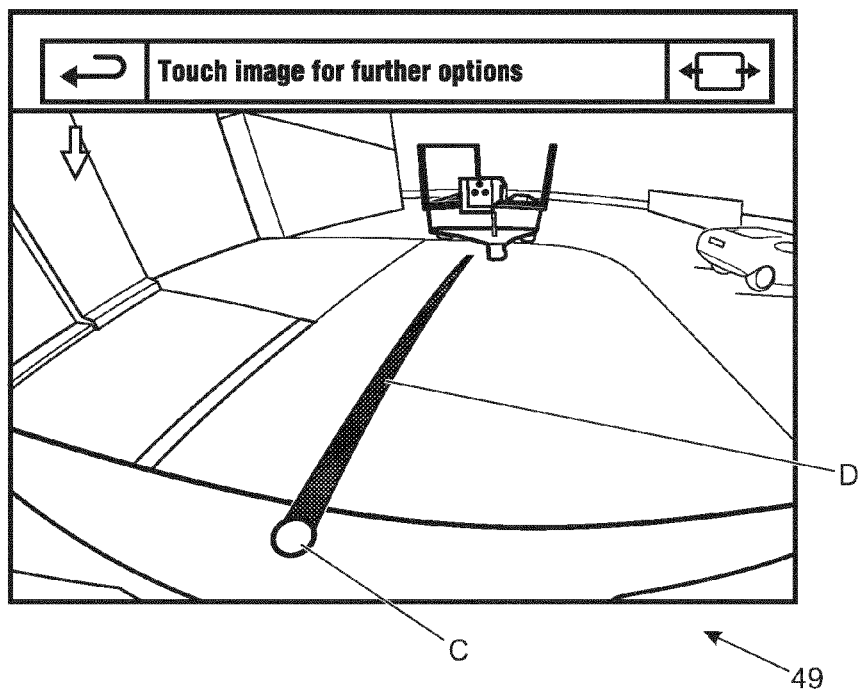

The steering angle control signal is also output to a human machine interface (HMI) module 45. The HMI module 45 is coupled to a display screen 47 which displays a video image 49 from the rear camera 11 (or a composite image derived from the image data for each of the cameras 11, 13, 15). The HMI module 45 is configured to overlay predicted vehicle movement information onto the video image 49 to show the route to be followed by the vehicle 3 based on the current steering angle. As shown in FIG. 3A, the HMI module 45 displays a first pair of parallel lines A representing the path to be followed by the wheels W1-4 based on the current steering angle; and a second pair of parallel lines B representing the path to be followed by the wheels of the trailer 9. The HMI module 45 could be configured to display vehicle trajectory lines from the vehicle 3 to the trailer 9 to facilitate visualisation of the actual trajectory that the vehicle 3 will follow. The HMI module 45 can be switched to an alternate view in which the position of the tow hitch 5 is represented by a circular indicia C in the appropriate location on the display screen 47. As shown in FIG. 3B, a third line D is overlaid on the video image to represent the path that the tow hitch 5 will follow based on the current steering angle.

The electronic control unit (ECU) further comprises an obstruction avoidance module 37C configured to determine whether any obstructions identified by the image processing module 37A are in the path of the vehicle 3. The obstruction avoidance module 37C is in communication with the image processing module 37A to receive obstruction data, for example indicating the size and position of the detected obstructions. The obstruction avoidance module 37C utilises this obstruction data together with vehicle operating parameters, such as steering angle and direction of travel, to determine whether the identified obstructions are in the path of the vehicle 3. The obstruction avoidance module 37C can also be adapted to determine whether there is sufficient space available to manoeuvre the vehicle 3 to provide the required alignment with the trailer 9.

Figure 4A:
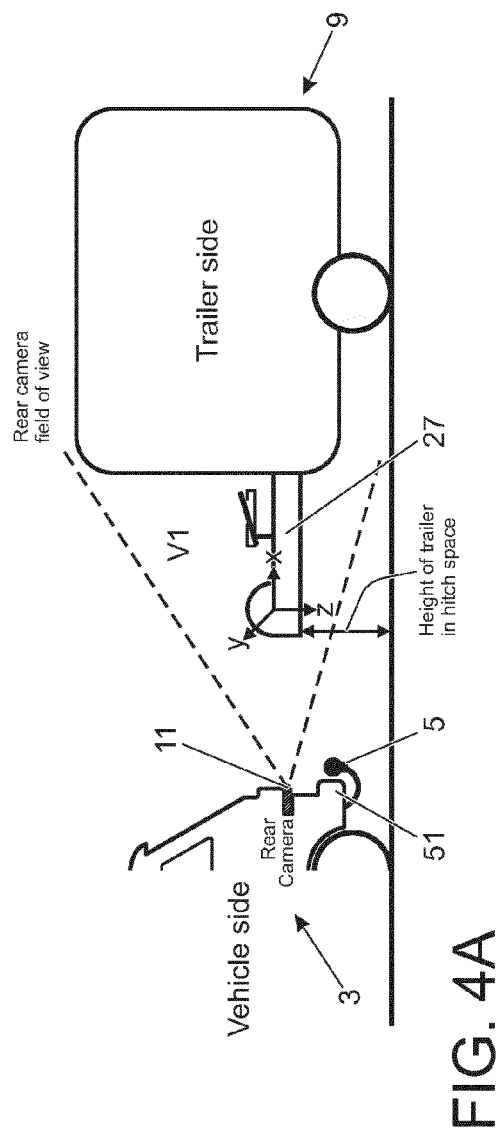
FIGS. 4A and 4B show alternate positions of a rearward facing camera for use in the hitch assistance system according to an embodiment of the present invention.
Figure 4B:
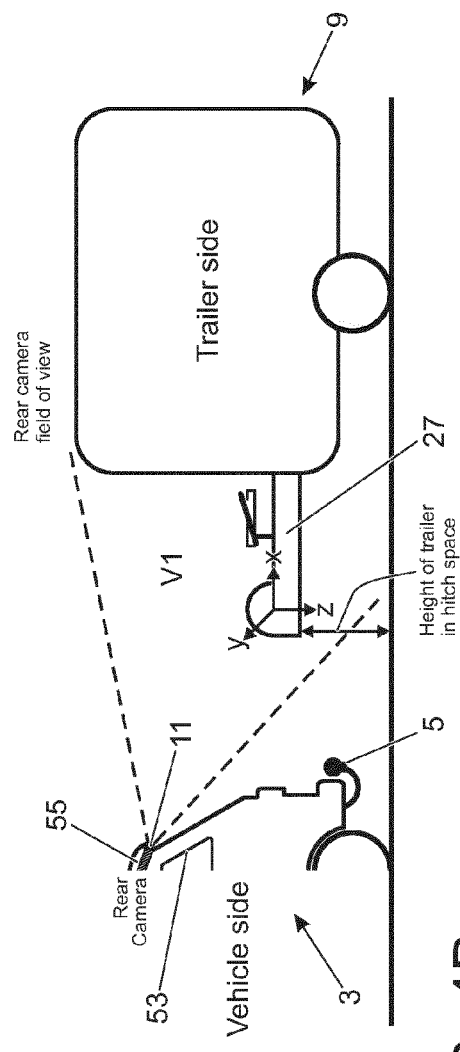

A side elevation view of the vehicle 3 and the trailer 9 is shown in FIGS. 4A and 4B to represent alternative positions of the rear camera 11. In the arrangement illustrated in FIG. 4A, the rear camera 11 is disposed above a rear bumper 51 of the vehicle 3, for example proximal to a vehicle registration plate (not shown). In the arrangement illustrated in FIG. 4B, the rear camera 11 is disposed above a rear windshield 53, for example beneath a tailgate spoiler 55. In both arrangements, the rear camera 11 is oriented to provide a field of view (illustrated by dashed lines) encompassing the front face 33 of the trailer 9 and the trailer coupling 7. The processor 37 also comprises a height detection module 37D which analyses the image data from the rear camera 11 to determine the height of the trailer coupling 7.

Figure 5:
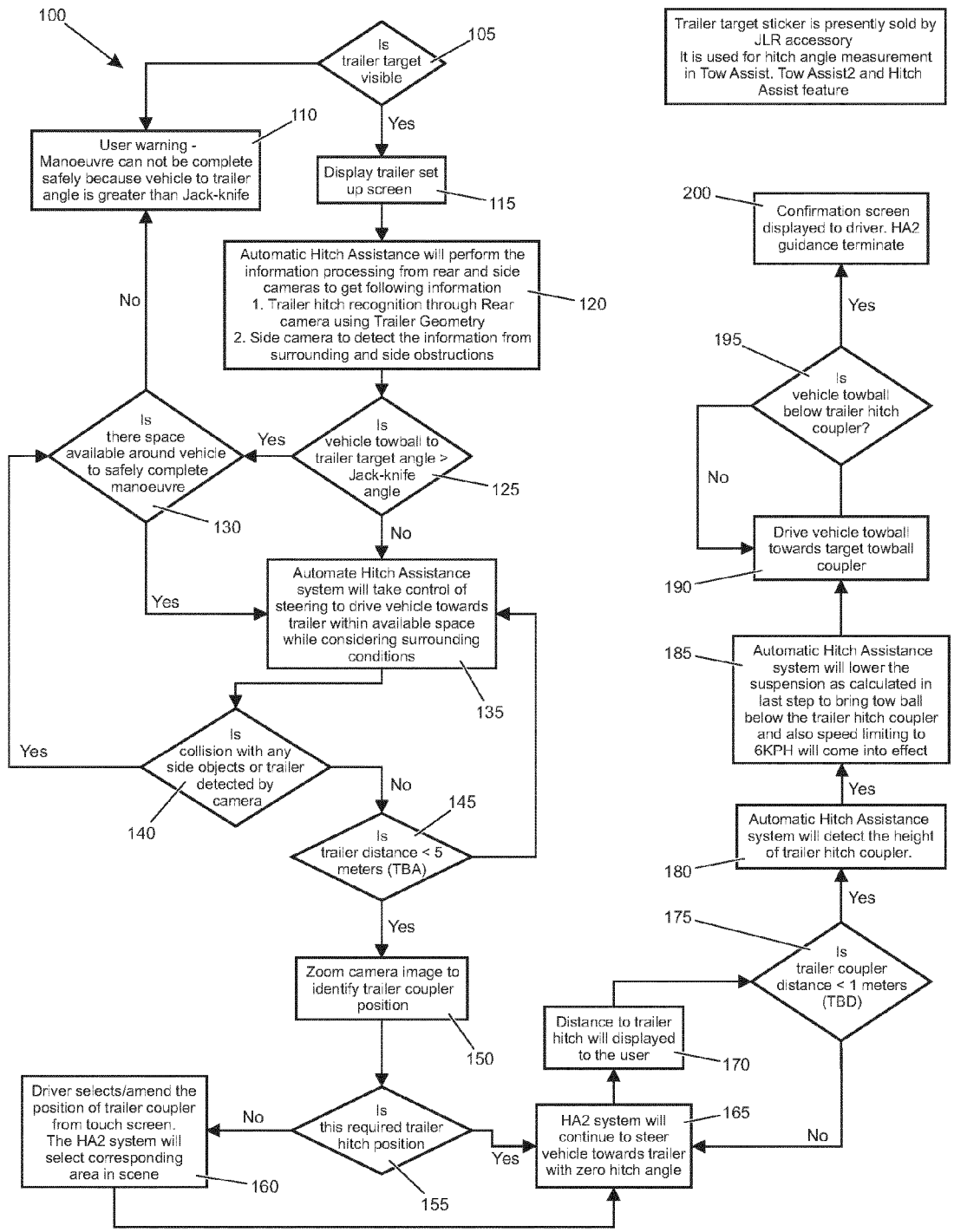
FIG. 5 shows a flow chart outlining the operation of the hitch assistance system in accordance with an embodiment of the present invention.

The operation of the hitch assistance system 1 will now be described with reference to the flow chart 100 shown in FIG. 5. The hitch assistance system 1 is activated when the vehicle 3 is positioned in front of the trailer 9, for example by a user selecting an on-screen option via the HMI module 45. Once activated, the hitch assistance system 1 performs a check to determine if the trailer target 31 is visible (STEP 105). If the trailer target 31 is not visible (i.e. the image processing module 37A cannot identify the target 31 in the image data from the cameras 11, 13, 15), a user notification is output to advise that the hitching manoeuvre cannot be completed safely as the hitch angle α is greater than a jack-knife angle (STEP 110). (The jack-knife angle is the angle at which the trailer 9 will jack-knife and can be calculated using known algorithms.) If the trailer target 31 is visible (i.e. the image processing module 37A identifies the target 31 in the image data from the cameras 11, 13, 15), a setup screen is displayed by the HMI module 45 on the display screen 47 (STEP 115).

The hitch assistance system 1 then operates to detect said first and second feature sets 35, 39 (STEP 120). The distance between the vehicle 3 and the trailer 9 is determined by measuring the distance between the centres of the circles in the target 31. When the distance between the vehicle 3 and the trailer 9 is greater than 5 meters, the image processing module 37A analyses the image data from the cameras 11, 13, 15 to identify the first feature set 35. The image processing module 37A can thereby determine the position and orientation of the trailer 9 in relation to the vehicle 3. The image processing module 37A also analyses the image data from the side cameras 13, 15 to detect surrounding obstructions, for example on either side of the vehicle 3 or the trailer 9.

The image processing module 37A performs a check to determine if the hitch angle α is greater than the jack-knife angle (STEP 125). If the hitch angle α is greater than the jack-knife angle, the image processing module 37A analyses the image data from the side cameras 13, 15 to determine if there is sufficient space available around the vehicle 3 to safely complete the hitching manoeuvre (STEP 130). If there is insufficient space available, a user notification is output to advise that the hitching manoeuvre cannot be completed safely (STEP 110). If there is sufficient space available to position the vehicle 3 such that the hitch angle α is less than the jack-knife angle; or if the hitch angle α is already less than the predefined jack-knife angle, the vehicle guidance module 37B outputs a steering angle control signal to the EPAS module 41 to guide the vehicle 3 towards the trailer 9 within the available space while considering the surrounding conditions (STEP 135). The driver is responsible for controlling the vehicle speed by operating the vehicle throttle (via a conventional accelerator pedal) as the vehicle is positioned relative to the trailer 9.

The obstruction avoidance module 37C performs an ongoing check to determine whether any obstructions detected by the image processing module 37A are in the path of the vehicle 3 (STEP 140). If an obstruction is detected in the path of the vehicle 3, the image processing module 37A analyses the image data from the side cameras 13, 15 to determine if there is sufficient space available around the vehicle 3 to safely complete the hitching manoeuvre (STEP 130). If no obstructions are detected in the path of the vehicle 3, the user notification is not issued and the distance between the vehicle 3 and the trailer 9 is measured (STEP 145). If the measured distance is greater than 5 meters, the processor 37 continues to track the relative position of the trailer 9 on the basis of the first feature set 35 (the target 31 in the present embodiment) and vehicle guidance module 37B outputs the steering angle control signal to the EPAS module 41 to steer the vehicle 3 towards the trailer 9 (STEP 135). If the measured distance is less than 5 meters, the rear camera 11 zooms in to the front of the trailer 9 to focus on the second feature set 39 (the hitch frame 27 and the trailer coupling 7 in the present embodiment) (STEP 150).

A graphical element (not shown) is displayed on the display screen 47 to indicate the position of the trailer coupling 7 detected by the image processing module 37A. The user is prompted to confirm that the displayed position of the trailer coupling 7 is correct (STEP 155). If the displayed position is incorrect, the user can select/amend the position of the graphical element on the display screen 47 to indicate the correct position of the trailer coupling 7 (STEP 160), for example using a touch screen interface. The image processing module 37A will thereafter select the corresponding area in the displayed scene and this will be defined as the trailer coupling 7 for the remainder of the procedure. Alternatively, the user can confirm that the indicated position corresponds to the actual location of the trailer coupling 7.

The vehicle guidance module 37B will then continue to steer the vehicle 3 towards the trailer 9 to displace the tow hitch 5 closer to the trailer coupling 7 (STEP 165). The distance between the tow hitch 5 and the trailer coupling 7 is displayed on the display screen 47 (STEP 170). A check is performed to determine when the measured distance between the tow hitch 5 and the trailer coupling 7 is less than 1 meter (STEP 175). When the distance is less than 1 meter, the height detection module operates to detect the height of the trailer coupling 7 (STEP 180).

The electronic control unit (ECU) is configured to lower the height of the vehicle suspension to lower the tow hitch 5 below the detected height of the trailer coupling 7 (STEP 185). The electronic control unit (ECU) also operates to limit the maximum vehicle speed to 6 km/h. The user continues to control the vehicle throttle to reverse the vehicle 3 to drive the tow hitch 5 towards the trailer coupling 7 (STEP 190). A check is performed to determine if the tow hitch 5 is below the trailer coupling 7 (STEP 195). When the electronic control unit (ECU) determines that the tow hitch 5 is below the trailer coupling 7, a confirmation screen is output to the display screen 47 (STEP 200).

The user typically then exits the vehicle 3 to lower a jacking wheel of the trailer 9, thereby lowering the trailer coupling 7 onto the tow hitch 5. The user should also connect the electrics for the trailer 9 to the electrical systems of the vehicle 3 in conventional manner.

The present invention is applicable to a range of different types of trailer 9. For example, the trailer 9 can be a caravan, a goods trailer, a flatbed trailer, a van trailer, a livestock trailer and so on. Similarly, the present invention is applicable to a range of different types of vehicles 3. For example, the vehicle 3 can be a motor vehicle, such as an off-road or sports utility vehicle; or a towing engine or tractor for a semi-trailer truck.

It will be appreciated that various changes and modifications can be made to the present invention without departing from the present invention. Further aspects of the present invention will be described with reference to the following numbered paragraphs.

1. A system for aligning a tow hitch mounted to a vehicle with a trailer coupling mounted to a trailer, the system comprising:
   an imaging system disposed on the vehicle to generate image data; and
   a processor configured to analyse said image data to identify first and second feature sets associated with said trailer; and to generate a guidance signal for steering the vehicle at least substantially to align the tow hitch with the trailer coupling;
   wherein the processor is configured to determine the position of the trailer coupling relative to the tow hitch in dependence on said first feature set when the distance between the vehicle and the trailer is greater than a predefined threshold; and to determine the position of the trailer coupling relative to the tow hitch in dependence on said second feature set when the distance between the vehicle and the trailer is less than said predefined threshold.

2. A system as described in paragraph 1, wherein the processor is configured to determine the position of the trailer coupling relative to the tow hitch in dependence on both said first feature set and said second feature set when the distance between the vehicle and the trailer is less than said predefined threshold.

3. A system as described in paragraph 1, wherein the imaging system is configured to focus on said first feature set when the distance between the vehicle and the trailer is greater than said predefined threshold; and/or to focus on said second feature set when the distance between the vehicle and the trailer is less than said predefined threshold.

4. A system as described in paragraph 1, wherein said first feature set comprises one or more targets mounted to the trailer; and/or said first feature set comprises a profile of the trailer; and/or said second feature set comprises a trailer coupling frame to which the trailer coupling is mounted; and/or the trailer coupling.

5. A system as described in paragraph 1, wherein the processor is configured to generate image correction data based on said first feature set and to apply said image correction data to the image data to identify said second feature set.

6. A system as described in paragraph 1, wherein the processor is configured to analyse said image data to identify obstructions proximal to said vehicle and/or said trailer; the processor optionally being configured to modify said steering guidance signal to avoid any obstructions identified in said image data.

7. A system as described in paragraph 1, wherein the processor is configured to analyse said image data to determine if there is sufficient space available to manoeuvre the vehicle to align the tow hitch with the trailer coupling.

8. A system as described in paragraph 1, wherein the processor is configured to analyse the image data to determine a height of the trailer coupling; and optionally to output a suspension height change signal to lower the tow hitch below the height of the trailer coupling.

9. A system as described in paragraph 1, wherein said processor is configured to output said steering guidance signal to a human machine interface (HMI) for display on a screen; and/or to an electronic power assisted steering (EPAS) system to control a steering angle of the vehicle.

10. A vehicle incorporating a system as described in paragraph 1, the system being operable to align a tow hitch mounted to the vehicle with a trailer coupling mounted to a trailer.

11. A method of aligning a tow hitch mounted to a vehicle with a trailer coupling mounted to a trailer, the method comprising:
receiving image data from an imaging system disposed on the vehicle;
analysing said image data to identify first and second feature sets associated with said trailer; and
generating a steering guidance signal for steering the vehicle at least substantially to align the tow hitch with the trailer coupling;
wherein the image data is analysed to determine the position of the trailer relative to the vehicle in dependence on said first feature set when the distance between the vehicle and the trailer is greater than a predefined threshold; and to determine the position of the trailer relative to the vehicle in dependence on said second feature set when the distance between the vehicle and the trailer is less than said predefined threshold.

12. A method as described in paragraph 11 comprising focusing on said first feature set when the distance between the vehicle and the trailer is greater than said predefined threshold; and/or focusing on said second feature set when the distance between the vehicle and the trailer is less than said predefined threshold.

13. A method as described in paragraph 11, wherein said first feature set comprises one or more targets mounted to the trailer; and/or said first feature set comprises a profile of the trailer; and/or said second feature set comprises a trailer coupling frame to which the trailer coupling is mounted; and/or said second feature set comprises the trailer coupling.

14. A method as described in paragraph 11 comprising generating image correction data based on said first feature set; and applying said image correction data to the image data to identify said second feature set.

15. A method as described in paragraph 11 comprising determining the position of the trailer coupling relative to the tow hitch in dependence on both said first feature set and said second feature set when the distance between the vehicle and the trailer is less than said predefined threshold.

16. A processor programmed to:
receive image data from an imaging system disposed on the vehicle;
analyse said image data to identify first and second feature sets associated with said trailer; and
generate a steering guidance signal for steering the vehicle at least substantially to align the tow hitch with the trailer coupling;
wherein the image data is analysed to determine the position of the trailer relative to the vehicle in dependence on said first feature set when the distance between the vehicle and the trailer is greater than a predefined threshold; and to determine the position of the trailer relative to the vehicle in dependence on said second feature set when the distance between the vehicle and the trailer is less than said predefined threshold.

17. A system for monitoring available space to manoeuvre a vehicle to align a tow hitch mounted to the vehicle with a trailer coupling mounted to a trailer, the system comprising:
an imaging system disposed on the vehicle to generate image data;
a processor configured to analyse said image data to identify obstructions proximal to said vehicle and/or to said trailer and to determine if there is sufficient space available to manoeuvre the vehicle to align the tow hitch with the trailer coupling.

18. A system as described in paragraph 17, wherein the processor is configured to generate a steering guidance signal for steering the vehicle at least substantially to align the tow hitch with the trailer coupling avoiding any obstructions identified by said processor.

19. A system as described in paragraph 17, wherein the processor is configured to determine if there is sufficient space available to manoeuvre the trailer when the tow hitch is coupled to the trailer coupling.

20. A method of monitoring available space to manoeuvre a vehicle to align a tow hitch mounted to the vehicle with a trailer coupling mounted to a trailer, the method comprising:
receiving image data from an imaging system disposed on the vehicle;
analysing said image data to identify obstructions proximal to said vehicle and/or to said trailer; and
determining if there is sufficient space available to manoeuvre the vehicle to align the tow hitch with the trailer coupling.

21. A method as described in paragraph 20 comprising generating a steering guidance signal for steering the vehicle at least substantially to align the tow hitch with the trailer coupling avoiding any obstructions identified during analysis of said image data.

The invention claimed is:

1. A system for monitoring available space to maneuver a vehicle to align a tow hitch mounted to the vehicle with a trailer coupling mounted to a trailer, the system comprising:
an imaging system disposed on the vehicle to generate image data; and
a processor configured to:
receive the image data generated by the imaging system and to analyze said image data to identify obstructions proximal to said vehicle and/or to said trailer;
determine a position of the trailer relative to the vehicle and to calculate a required path to align the tow hitch with the trailer coupling such that a hitch angle is within a predefined range when the vehicle is coupled to the trailer, the hitch angle being defined between a longitudinal axis of the vehicle and a longitudinal axis of the trailer; and
determine if there is sufficient space available to maneuver the vehicle along the calculated path to align the tow hitch with the trailer coupling to provide the required alignment.

2. The system as claimed in claim 1, wherein the processor is configured to generate a steering guidance signal for steering the vehicle at least substantially to align the tow hitch with the trailer coupling avoiding any obstructions identified by said processor.

3. The system as claimed in claim 1, wherein the processor is configured to determine if there is sufficient space available to maneuver the trailer when the tow hitch is coupled to the trailer coupling.

4. A method of monitoring available space to maneuver a vehicle to align a tow hitch mounted to the vehicle with a trailer coupling mounted to a trailer, the method comprising:
receiving image data from an imaging system disposed on the vehicle;
analyzing, via a processor, said image data to identify obstructions proximal to said vehicle and/or to said trailer;
determining, via the processor, a position of the trailer relative to the vehicle and calculating a required path to align the tow hitch with the trailer coupling such that a hitch angle is within a predefined range when the vehicle is coupled to the trailer, the hitch angle being defined between a longitudinal axis of the vehicle and a longitudinal axis of the trailer; and
determining, via the processor, if there is sufficient space available to maneuver the vehicle along the calculated path to align the tow hitch with the trailer coupling to provide the required alignment.

5. The method as claimed in claim 4, comprising generating, via the processor, a steering guidance signal for steering the vehicle at least substantially to align the tow hitch with the trailer coupling avoiding any obstructions identified during analysis of said image data.

6. The method as claimed in claim 4, comprising determining, via the processor, if there is sufficient space available to maneuver the trailer when the tow hitch is coupled to the trailer coupling.

7. The method as claimed in claim 5, comprising determining, via the processor, if there is sufficient space available to maneuver the trailer when the tow hitch is coupled to the trailer coupling.

8. The method as claimed in claim 4, comprising determining, via the processor, a route required to maneuver the vehicle into a position relative to the trailer based on a vehicle parameter.

9. The method as claimed in claim 5, comprising generating, via the processor, the steering guidance signal dynamically or by selecting a predefined steering guidance signal based on the available space to maneuver the vehicle as determined by the processor.

10. The system as claimed in claim 2, wherein the processor is configured to determine if there is sufficient space available to maneuver the trailer when the tow hitch is coupled to the trailer coupling.

11. The system as claimed in claim 1, wherein the system provides a manual override to the obstruction identification performed by the processor.

12. The system as claimed in claim 1, wherein the processor is configured to calculate a route required to maneuver the vehicle into a position relative to the trailer based on a vehicle parameter.

13. The system as claimed in claim 12, wherein the vehicle parameter comprises vehicle length and/or vehicle width.

14. The system as claimed in claim 2, wherein the processor is configured to generate the steering guidance signal dynamically or by selecting a predefined steering guidance signal based on the available space to maneuver the vehicle as determined by the processor.

15. A processor for a vehicle, the processor programmed to:
receive image data from an imaging system disposed on the vehicle;
analyze the image data to identify obstructions proximal to the vehicle and/or to a trailer and to determine a position of the trailer relative to the vehicle;
calculate a required path to align the tow hitch with the trailer coupling such that a hitch angle is within a predefined range when the vehicle is coupled to the trailer, the hitch angle being defined between a longitudinal axis of the vehicle and a longitudinal axis of the trailer; and
determine if there is sufficient space available to maneuver the vehicle along the calculated path to align a tow hitch with a coupling of the trailer to provide the required alignment.

16. The processor as claimed in claim 15, wherein the processor is configured to generate a steering guidance signal for steering the vehicle at least substantially to align the tow hitch with the trailer coupling avoiding any obstructions identified by the processor.

17. A computer program product for monitoring available space to maneuver a vehicle to align a tow hitch mounted to the vehicle with a trailer coupling mounted to a trailer, the computer program product comprising a non-transitory computer readable storage medium having encoded thereon instructions that, when executed on a processor, cause the processor to perform operations comprising:
receiving image data from an imaging system disposed on the vehicle;
analyzing said image data to identify obstructions proximal to said vehicle and/or to said trailer and to determine a position of the trailer relative to the vehicle;
calculating a required path to align the tow hitch with the trailer coupling such that a hitch angle is within a predefined range when the vehicle is coupled to the trailer, the hitch angle being defined between a longitudinal axis of the vehicle and a longitudinal axis of the trailer; and determining if there is sufficient space available to maneuver the vehicle along the calculated path to align the tow hitch with the trailer coupling to provide the required alignment.

18. The system as claimed in claim 1, wherein the processor is configured to determine if the hitch angle is greater than a jack-knife angle and, if the hitch angle is greater than the jack-knife angle, to analyze the image data to determine if there is sufficient space available around the vehicle to complete the hitching maneuver.

19. The system as claimed in claim 1, wherein the processor is configured to adjust the calculated path of the vehicle to modify the hitch angle if the identified obstructions will limit the turning circle of the trailer.

* * * * *